US005617895A

United States Patent [19]

Pfuhl et al.

[11] Patent Number: 5,617,895

[45] Date of Patent: Apr. 8, 1997

[54] HYDRAULIC CONTROL VALVE

[75] Inventors: Berthold Pfuhl, Markgroeningen; Friedhelm Zehner, Ludwigsburg; Joachim Zumbraegel, Eberdingen, all of Germany

[73] Assignee: Robert Bosch GmbH, Stuttgart, Germany

[21] Appl. No.: 387,833

[22] PCT Filed: Feb. 19, 1994

[86] PCT No.: PCT/DE94/00183

§ 371 Date: Feb. 17, 1995

§ 102(e) Date: Feb. 17, 1995

[87] PCT Pub. No.: WO94/21947

PCT Pub. Date: Sep. 29, 1994

[30] Foreign Application Priority Data

Mar. 13, 1993 [DE] Germany .......................... 43 07 990.3

[51] Int. Cl.[6] ............................ F15B 13/04; F16K 11/07

[52] U.S. Cl. ................................ 137/625.69; 137/625.3; 251/282

[58] Field of Search ........................... 137/625.3, 625.69; 251/282

[56] References Cited

U.S. PATENT DOCUMENTS 2,747,612 5/1956 Lee ...................................... 251/282 X
2,987,050 6/1961 Oppenheimer et al. ....... 137/625.69 X
3,735,780 5/1973 Heid .................................. 137/625.69
4,923,172 5/1990 Wood et al. .................. 137/625.69 X

FOREIGN PATENT DOCUMENTS 0030336 11/1980 European Pat. Off. .

OTHER PUBLICATIONS

H.–J. Feigl, "Stroemungskraftkompensation in Hydraulik–Schieberventilen", 9th Aachen Fluid Technology Colloquium 1990, pp. 79 to 97.

*Primary Examiner*—Gerald A. Michalsky
*Attorney, Agent, or Firm*—Michael J. Striker

[57] ABSTRACT

A hydraulic control valve (10) is proposed which comprises a device (39) for flow force compensation at an outlet control edge (36) and in which the spool sleeve (24) and the associated control spool (11) are of relatively simple construction. By means of control openings (41) and outlet openings (43) separated from one another in the spool sleeve (24), in the region of a deflecting annular groove (42), which deflects the flow behind the outlet control edge (36), in the interior of the spool sleeve, a one-piece construction of the spool sleeve (24) can be achieved, for which no internal machining of the outlet control edge (36) is required.

12 Claims, 3 Drawing Sheets

HYDRAULIC CONTROL VALVE

BACKGROUND OF THE INVENTION

The present invention relates to a hydraulic control valve.

The limits to the utilization of directly operated hydraulic valves are essentially dictated by the ratio of flow forces to actuating forces. If the flow force can be reduced, the utilization limits can be extended or the actuating force reduced. In respect of the cause, amount and direction of action of such flow forces at control edges of hydraulic valves, reference is made to relevant literature, for example the information that can be gained from the textbook by J. F. Blackburn, G. Reethof, J. L. Shaerer: Fluid Power Control I, II, III, Krausskopfverlag, Mainz 1962. Various possible ways of reducing such flow forces have also already been described, although as a rule such known methods can be employed only for inlet or outlet control edges, while at the same time giving rise to a heavy static pressure loss and generally entail considerable expense. An additional factor is that flow force compensation at an outlet control edge is incomparably more difficult to achieve than at an inlet control edge.

From the records of the 9th Aachen Fluid Technology Colloquium 1990, in the contribution "Flow Force Compensation in Hydraulic Slide Valves" by H. J. Feigel, Pages 79 to 97, a congeneric hydraulic control valve comprising a device for flow force compensation at an outlet control edge is known. The control valve is here in the form of an electromagnetically operable four-way control valve having four pairs of control edges, each outlet control edge having a flow force compensation device in which a spool sleeve receiving the control spool has, in the region of an outlet control edge, a deflecting annular groove disposed in the sleeve. In order here to avoid expensive internal machining, the spool sleeve has a configuration in which a middle sleeve is provided at each of its two outer ends with an additional attached sleeve. In this way the outlet control edge on the sleeve can be produced relatively simply and with accurate dimensions by facing. Furthermore, the deflecting annular groove is formed by the attached sleeve fitted, which has a larger diameter. It is now a disadvantage of this solution that in order to avoid internal machining of the outlet control edge great expense has to be incurred here to achieve flow force compensation. Thus, this valve works with a three-part spool sleeve arranged, with different outside diameters, in the casing. This requires accurate machining of the casing to avoid jamming of the spool with the multi-part spool sleeve construction. Moreover, axially extending pins are disposed on the middle sleeve, starting from the outlet control edge, so that simple production of the outlet control edge, for example by turning, is not possible. In addition, with this configuration it is hard to achieve desired flow geometries at the control edges. Furthermore, the multipart sleeve construction entails increased expense for sealing. The manufacture and assembly of the control valve also become more difficult.

In addition, from EP 0 030 336 B1 a pressure-reducing valve is known, which is constructed in the style of an insertable valve and has flow force compensation. The flow force compensation device is here constructed for an inlet control edge, the control spool disposed in a sleeve being provided, in a duct region through which the pressure medium flows, with a piston collar which has conical bevels and which generates compensating impulse forces. No compensation for flow forces at an outlet control edge is provided here.

SUMMARY OF THE INVENTION

Accordingly, it is an object of the present invention to provide a hydraulic control valve which avoids the disadvantages of the prior art.

In keeping with these objects and with others which will become apparent hereinafter, one feature of the present invention resides, briefly stated, in a hydraulic control valve with a spool sleeve arranged in a valve casing and receiving a control spool which is guided for longitudinal movement and is able to control at least a connection from an admission side via an outlet control edge to a return chamber, wherein in accordance with the present invention the spool sleeve has a one-piece configuration at least in the region comprising the control edge, with the casing, and a deflecting annular groove, and the control edge is formed by additional radial through control openings which are arranged in the spool sleeve and are arranged at an axial distance from outlet openings, and also the control openings in an outside wall of the spool sleeve are at least substantially closed by the valve casing.

When the hydraulic control valve is designed in accordance with the present invention, it has the advantage that, while it retains the favourable flow force compensation at the outlet control edge, it dispenses with internal machining of this control edge and in addition is less expensive and simpler to construct. Thus, for the compensation of the flow forces at the outlet control edge it is possible to retain a process which, in comparison with other compensation processes, works with low pressure losses. Above all, the spool sleeve can be made in one piece without internal machining of the control edges, so that no additional parts are required. This permits economical machining of the parts. In addition, the one-piece sleeve permits a stronger construction and a more favourable arrangement of the sleeve in the casing. The control openings themselves can be produced relatively economically and with accurate dimensions by electroerosion. Furthermore, the separate formation of control openings, on the one hand, and outlet openings, on the other hand, offers more scope in the optimum design of the flow force compensation in the region of the outlet control edge. No particular expense need be incurred for the external covering of the control openings in the spool sleeve, since this function is taken over by the casing which in any case is provided. The impulse produced in the deflecting annular groove in the spool sleeve can thus without difficulty be returned to the control spool.

In accordance with a further feature of the present invention, a plurality of control openings and a plurality of outlet openings are arranged uniformly distributed along the periphery in the spool sleeve, and the control openings are mutually offset as viewed in the direction of rotation, relative to the outlet openings. With such a configuration large control cross-sections can be accommodated in a simple manner in a confined space. Also advantageous is a configuration in which the control opening has substantially the shape of an isosceles trapezoid whose shorter parallel side forms the control edge. With this configuration different flow geometries can be achieved at the outlet control edges, whereby the control valve is more adaptable to different applications. It is in addition expedient for the sleeve to have a configuration in which the control opening and the outlet openings in the spool sleeve are so arranged that webs of material, which in particular extend as far as the inner wall of the spool sleeve, are left between them. As a result, the sleeve has great strength as well as a simple construction. In order to combine optimum compensation of flow forces with a compact construction of the valve, it is advantageous for it to have a configuration in the spool sleeve the outer openings extends inside the deflecting annular groove and the control openings lie substantially inside the deflecting annular groove, and also in the starting position of the control spool, the annular external groove in the control spool lies inside the deflecting annular groove in the spool sleeve. It is particularly advantageous for this construction to be applied to a four-way control valve. In addition, it is expedient for the flow force compensation according to the invention to be combined with devices for flow force compensation at the inlet control edges, for which it is particularly suitable, whereby the limits to the utilization of directly controlled control valves can be further extended. Furthermore, the flow force compensation device can also advantageously be applied to hydraulic valves designed in the style of an insertable or cartridge valve. Further advantageous developments can be seen in the other claims, the description and the drawing.

DESCRIPTION OF THE EXEMPLARY EMBODIMENT

Figure 1:
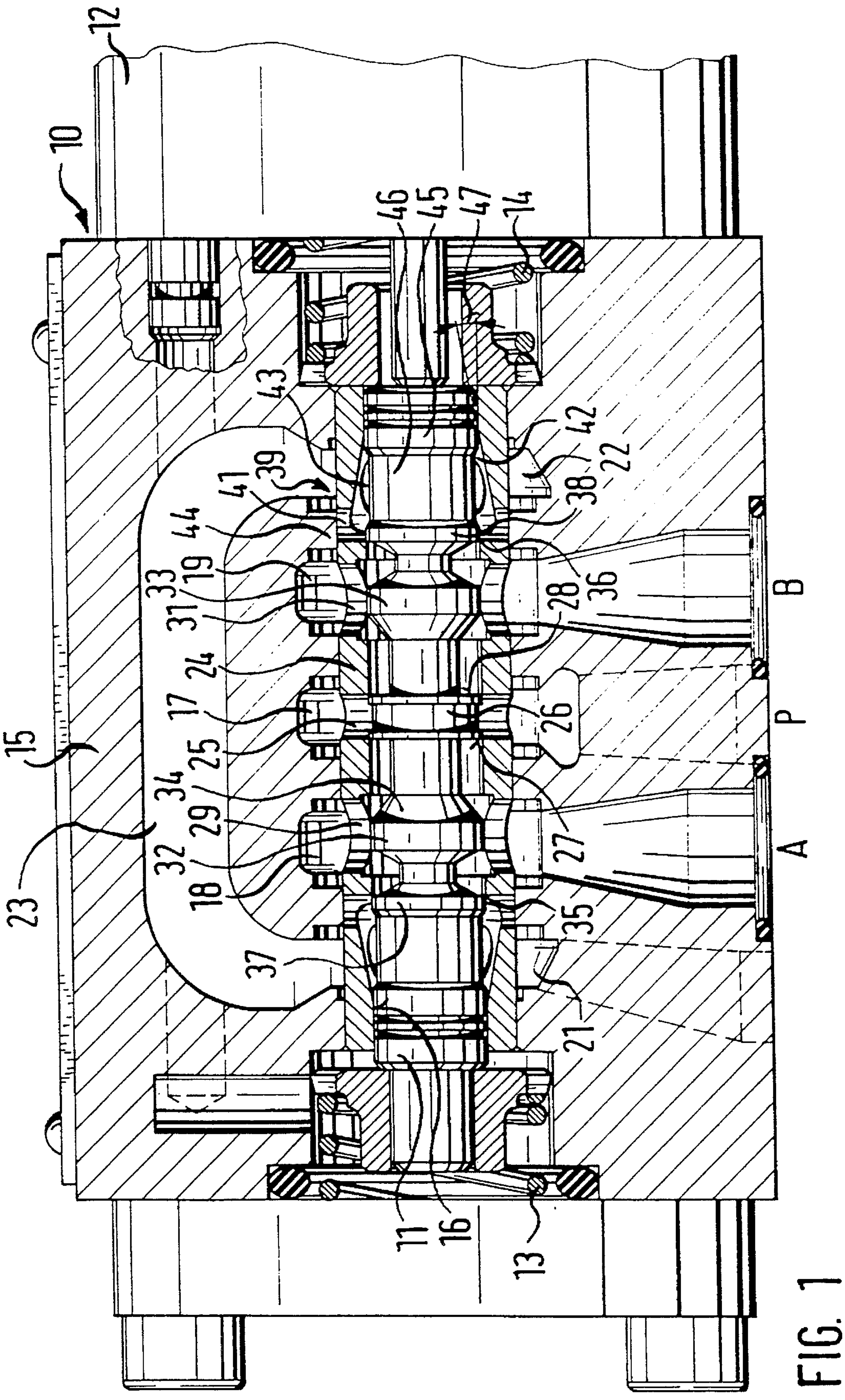
FIG. 1 shows a longitudinal section through a hydraulic control valve comprising a device for flow force compensation at an outlet control edge.

FIG. 1 shows, in a simplified representation as a hydraulic control valve, a single-stage, continuous action control valve 10 whose control spool 11 can be actuated by a control magnet 12 against the force of return springs 13, 14. The electromagnetic control valve 10 has a five-chamber configuration known per se, for which purpose its casing 15 has a longitudinal through bore 16 extending through a centrally disposed admission chamber 17 and also through two motor chambers 18, 19 disposed next to said chamber, as well as through two return chambers 21 and 22 following at the respective outer ends. The admission chamber 17 is connected in the usual manner to a connection P, the motor chambers 18, 19 to the respective consumer connections A and B, and the two return chambers 21 and 22 are connected via a transverse duct 23 to one another and to a tank connection R.

A spool sleeve 24, in which the control spool 11 is sealingly slidably guided, is inserted into the longitudinal bore 16. For the control valve 10 in a configuration comprising four pairs of control edges there are provided in the spool sleeve 24 cutouts through which pressure medium can flow between the various chambers 17–22 into the interior of the spool sleeve 24 and vice versa. For this purpose the spool sleeve 24 is provided in the region of the admission chamber 17 with inlet openings 25, which can be overridden by a first, central piston collar 26 on the control spool 11. At these inlet openings 25 a first inlet control edge 27 and a second inlet control edge 28 are formed, each of these pairs of control edges consisting of a control edge, fast with the casing, on the spool sleeve 24 and of an associated spool edge on the first piston collar 26. The first inlet control edge 27 is allocated to the connection from P to A, while the second inlet control edge 28 controls the connection from P to B.

In the region of the first motor chamber 18 the spool sleeve 24 has through bores 29, while correspondingly in the second motor chamber 19 the spool sleeve 24 has similar through bores 31. In the case of the control spool 11 shown in the middle position in FIG. 1, piston collars 32 and 33 respectively lie in the region of the through bores 29, 31, and are in each case formed on the control spool 11 and have a conical bevel 34 on their respective sides facing the inlet control edges 27, 28. These piston collars 32, 33 have no control function, but serve solely for flow force compensation, as will be described in greater detail later on.

In the regions of the spool sleeve 24 between the two motor cheers 18, 19 and the adjoining return chambers 21 and 22 respectively are situated the third and fourth pairs of control edges respectively, which form a first outlet control edge 35 and a second outlet control edge 36 respectively. These outlet control edges 35, 36 also consist in each case of a control edge, fast with the casing, on the spool sleeve 24, and of an associated control edge on a fourth and fifth piston collar 37 and 38 respectively on the control spool 11. Associated with the outlet control edges 35, 36 is in each case a flow force compensation device on these control edges, these devices being of identical construction, so that hereinbelow this device 39 will be explained more fully only in connection with the second outlet control edge 36.

Figure 4:
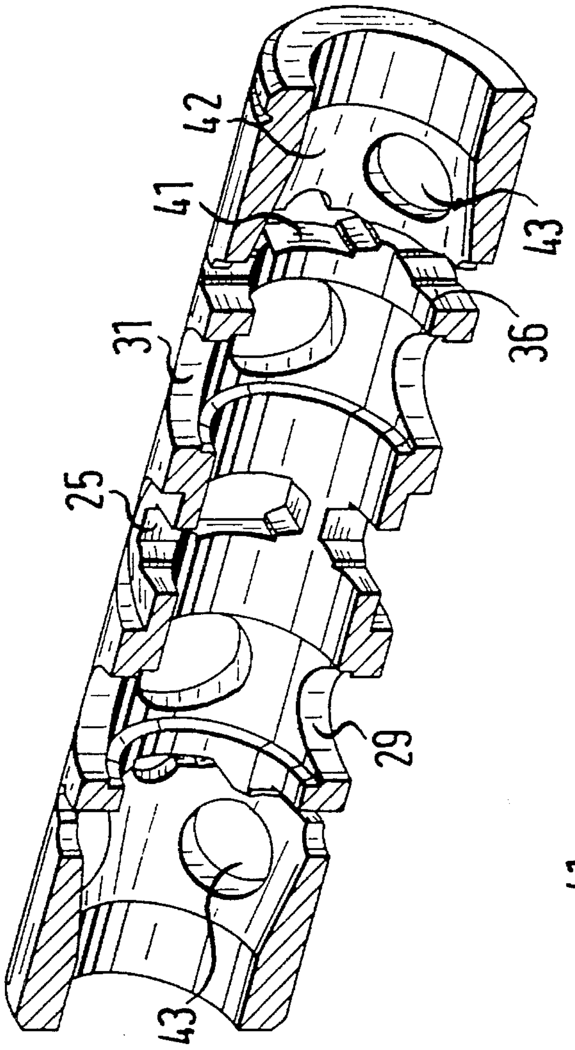
FIG. 4 shows a longitudinal section through the spool sleeve shown in FIG. 3.
Figure 3:
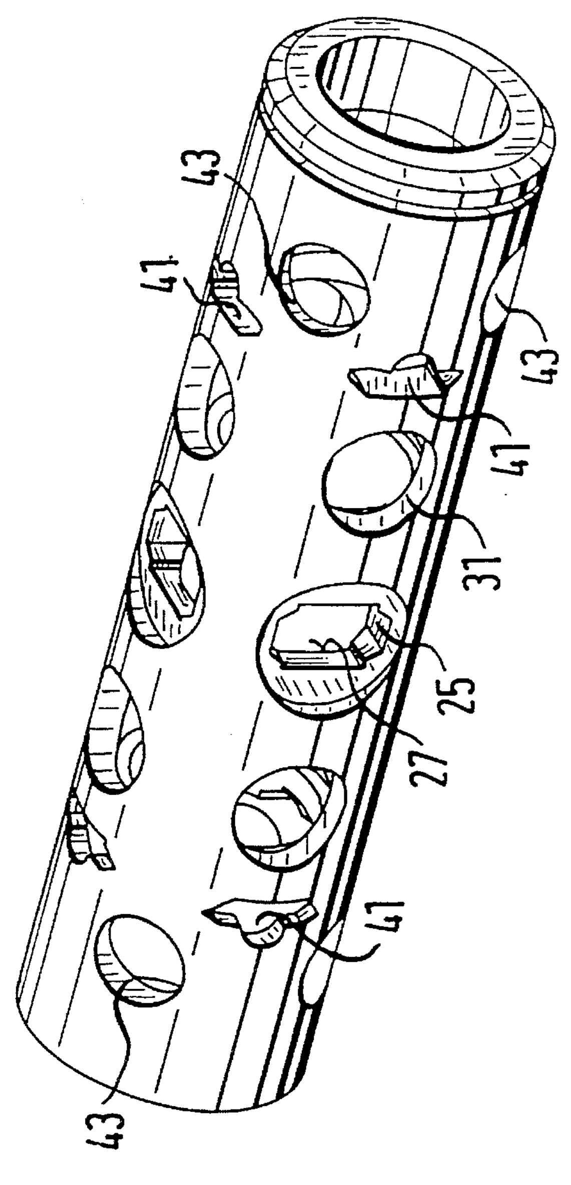
FIG. 3 shows in perspective the spool sleeve of the control valve shown in FIG. 1.

As can better be seen in FIG. 1 in conjunction with FIG. 3, which shows the spool sleeve 24 in perspective, and in conjunction with FIG. 4, which shows a longitudinal section through said spool sleeve, in this flow force compensation device 39 the outlet control edge 36 is formed on four control openings 41 which are arranged in a uniform distribution along the periphery of the spool sleeve 24. Each of these control openings 41 has a substantially trapezoidal shape with lateral sides of equal length, the actual outlet control edge being in each case formed by the shorter of the parallel sides thereof. All the control openings 41 are in the form of radial through openings in the spool sleeve 24, so that they can be produced relatively simply and with accurate dimensions by an electrical wire erosion process. Consequently, no internal machining of the spool sleeve 24 is required for the production of the outlet control edges 35, 36. As shown more clearly in FIG. 1, these control openings 41 project in the interior of the spool sleeve 24 into a ring-shaped deflecting annular groove 42, whose axial length amounts to a multiple of the axial extent of the control openings 41. In a region inside this ring-shaped deflecting annular groove 42 the spool sleeve 24 now has four outlet openings 43 which point radially outwards and which connect the interior of the spool sleeve 24 to the associated second return chamber 22. These outlet openings 43, which are uniformly distributed along the periphery, lie at a distance from the control openings 41, viewed in the axial direction of the spool sleeve 24, and are in addition arranged offset in the direction of rotation relative to said control openings. The control openings 41 and outlet openings 43 are adapted to one another in such a manner that in this region the spool sleeve 24 has continuous webs of material and thus possesses adequate strength. While the outlet openings 43 correspond to the second return chamber 22, the control openings 41, which lie further inwards in the spool sleeve 24, are closed on the outside by a casing web 44. In addition, the control spool 11 has in the region of this force compensation device 39 an annular external groove 46 which lies between the fifth piston collar 38 and an external collar 45, and which in the middle position of the control spool 11 shown in the drawing extends inside the deflecting annular groove 42.

For an optimum design of the device 39 for reducing flow forces at the outlet control edge 36 a number of parameters exist, which can be adapted to one another. These include above all the outside diameter of the external groove 46 on the control spool 11 and also its axial length, as well as the maximum diameter of the deflecting annular groove 42 and its cone angle 47. In addition, the diameter of the outlet openings 43 can also be varied.

Figure 2:
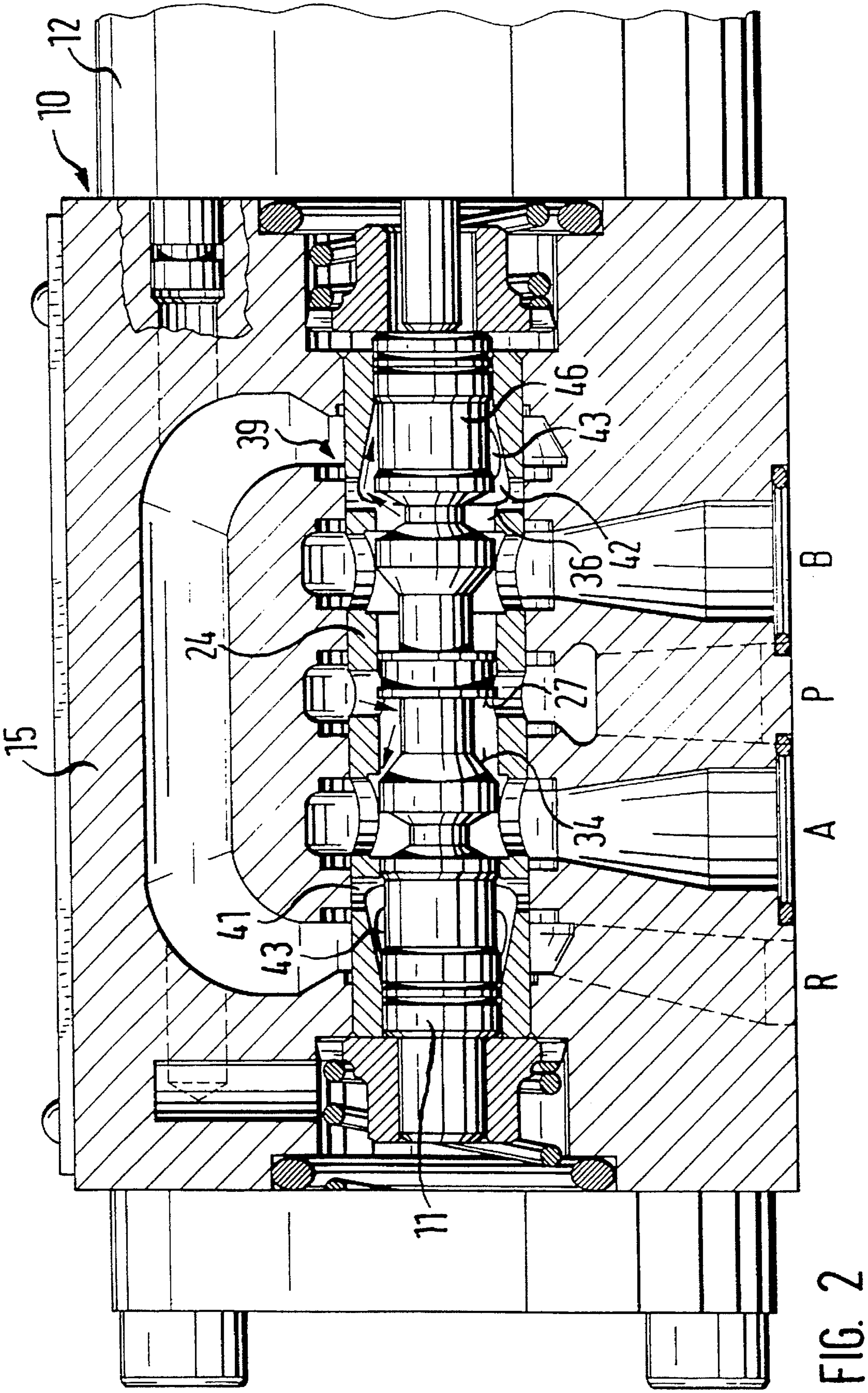
FIG. 2 shows a longitudinal section through the control valve shown in FIG. 1, with a control spool in the working position.

In order to explain the mode of operation of the hydraulic control valve 10 comprising a device 39 for flow force compensation at an outlet control edge 36, reference is made to FIG. 2, in which the control spool 11 has been deflected to the right, as viewed in FIG. 2, into a working position. The basic functioning of this flow force compensation is taken as known per se, for example from the work by Feigel mentioned above, in which this compensation process is described more fully, in particular in FIGS. 11 and 13 and in the appertaining text, so that below it will be discussed only to the extent necessary for understanding the invention.

In the position of the control spool 11 shown in FIG. 2 pressure medium flows from the connection B via the through bores 31 in the spool sleeve 24 into the interior of the latter, flows through the outlet control edge 36, and is at least partly deflected in the deflecting annular groove 42 before the pressure medium passes via the outlet openings 43 into the second return chamber 22 and then to the connection R. This flow path is partly indicated by flow arrows in the device 39. The pressure medium flowing outwards from the interior of the spool sleeve 24 past the second outlet control edge 36 thereby produces an impulse on the control spool 11, loading the latter in the direction of the closing movement. After the second outlet control edge 36 the pressure medium cannot then flow directly into the casing 15 from the spool sleeve 24, but is deflected in the spool sleeve 24 by the deflecting annular groove 42 and is returned to the control spool 11. Only a small part of the pressure medium flow can pass without significant deflection through the outlet openings 43 directly into the second return chamber 22. The part of the pressure medium flow nevertheless returned to the control spool 11 produces on the control spool 11 an impulse which compensates the closing impulse force at the outlet control edge 36. As is clearly shown in FIG. 2 in conjunction with FIG. 1, the radial through control openings 41 in the spool sleeve 24 are thus completely or at least substantially closed by the housing web 44 to such an extent that this deflection in the spool sleeve 24 also occurs. The device 39 for flow force compensation at the outlet control edge can thus be achieved with a spool sleeve 24 of one-piece configuration, while internal machining of the outlet control edges can be dispensed with. In addition, this separate formation of control openings 41 and of outlet openings 43 axially offset in relation thereto permits greater scope in the optimization of the flow force compensation device 39.

As can also be seen from FIG. 2, in the control valve 10 a flow force compensation device can also be constructed at the inlet control edge 27. Pressure medium is passed via this inlet control edge 27 from the admission chamber 17 through the interior of the spool sleeve 24 to the first motor chamber 18, the direction of this flow being shown in simplified fashion by two flow arrows. In a manner known per se the pressure medium flowing into the control spool 11 at the inlet control edge 27 thereby exerts a closing impulse force on the control spool 11. At the same time the deflection of the flow with the aid of the conical bevel 34 on the piston collar 32 produces an oppositely directed impulse force and thus a flow force compensation at the inlet control edge 27.

Because of the symmetrical configuration of the control spool 11 and spool sleeve 24, this compensation of the flow forces can be effected both at the outlet control edge and at the inlet control edge if the control spool 11 is deflected into an opposite working position to that shown in FIG. 2.

Modifications of the embodiment illustrated are of course possible without departing from the principle of the invention. Although the application of this flow force compensation to a directly controlled four-way control valve is particularly advantageous, it can also be advantageously applied to other control valves or pilot valves. The device can also be used in the case of insertable valves.

I claim:

1. Hydraulic control valve comprising a device for flow force compensation at an outlet control edge, comprising a spool sleeve which is arranged in a valve casing and which in its interior receives a control spool which is guided for longitudinal movement and is able to control at least a connection from an admission side via the outlet control edge to a return chamber, the outlet control edge being formed by a control edge, fast with the casing, and by an associated spool edge and the pressure medium flow guided over the outlet control edge being deflected—downstream of the control edge viewed in the direction of flow—at least partly in the direction of the control spool in a deflecting annular groove fashioned in the inside wall of the spool sleeve, and comprising outlet opening is situated in the region of said annular groove and in a plane extending radially relative to the longitudinal axis of the sleeve and through which the pressure medium can flow off from the interior of the spool sleeve to the return chamber, and further comprising an annular external groove, situated in the region of the outlet openings, in the control spool, characterized in that the spool sleeve (24) has a one-piece configuration at least in the region comprising the control edge (36), fast with the casing, and the deflecting annular groove (42), and in that its internal control edge (36) is formed by additional radial through control openings (41) which are arranged in the spool sleeve (24) and are arranged at an axial distance from the outlet openings (43), and in that said control openings (41) in the outside wall of the spool sleeve (24) are at least substantially closed by the valve casing (15).

2. Control valve according to claim 1, characterized in that a plurality of control openings (41) and a plurality of outlet openings (43) are arranged, uniformly distributed along the periphery, in the spool sleeve (24), and in that the control openings (41) are mutually offset, viewed in the direction of rotation, relative to the outlet openings (43).

3. Control valve according to claim 1, characterized in that the control opening (41) has substantially the shape of an isosceles trapezoid whose shorter parallel side forms the control edge (36).

4. Control valve according to claim 1, characterized in that in each case four control openings (41) and four outlet openings (43) are provided, the latter being in the form of bores.

5. Control valve according to claim 1, characterized in that the control openings (41) and the outlet openings (43) in the spool sleeve (24) are so arranged that webs of material, which in particular extend as far as the inner wall of the spool sleeve (24), are left between them.

6. Control valve according to claim 1, characterized in that, viewed in a axial direction of the spool sleeve (24), the outlet openings (43) extend inside the deflecting annular groove (42) and the control openings (41) lie substantially inside said deflecting annular groove (42).

7. Control valve according to claim 1, characterized in that in a starting position of the control spool (11) the annular external groove (46) in the control spool (11), viewed in the axial direction, lies inside the deflecting annular groove (42) in the spool sleeve (24).

8. Control valve according to claim 1, characterized in that it is in the form of a continuous action four-way control valve having four pairs of control edges and a five-chamber construction, in which each of the two outlet control edges (35, 36) is provided with a flow force compensation device (39), these devices being in particular situated at the two outer ends (38, 45) of the spool.

9. Control valve according to claim 8, characterized in that each inlet control edge (27, 28) has associated with it an additional flow force compensation device (32, 34), each of which is in particular in the form of a piston collar (32, 33) arranged on the control spool (11) and having a conical bevel (34).

10. Control valve according to claim 8, characterized in that it is in the form of a directly controlled control valve (10) having an electromagnetic drive (12).

11. Control valve according to claim 1, characterized in that the control spool and the spool sleeve are parts of an insertable valve which controls at least two ways.

12. Control valve according to claim 1, characterized in that the control spool and the spool sleeve are parts of a cartridge valve which controls at least two ways.

* * * * *